United States Patent
Berg

[15] 3,677,167
[45] July 18, 1972

[54] APPARATUS FOR PRESERVATION OF MEAT

[72] Inventor: Dennis Richard Berg, 10216 Vultee #2, Downey, Calif. 90241

[22] Filed: Jan. 7, 1970

[21] Appl. No.: 1,263

[52] U.S. Cl. ............................................................99/234
[51] Int. Cl. ..........................................................A47j 47/02
[58] Field of Search...................53/127; 99/234 R, 239, 240, 99/269, 194, 174, 175, 176, 195

[56] References Cited

UNITED STATES PATENTS 2,309,007   1/1943   Parsons..................................99/269
3,387,979   6/1968   Farha.....................................99/194

Primary Examiner—Robert W. Jenkins
Attorney—Fulwider, Patton, Rieber, Lee & Utecht

[57] ABSTRACT

A method for packing meat in a preservative atmosphere including the steps of subjecting the meat to a freezing atmosphere of preservative gas for a time sufficient to freeze a crust on the meat to trap a quantity of such gas therein. The meat is then placed in a container and the container hermetically sealed. Thereafter, the meat may be stored and the crust thawed to release such quantity of gas to create a preservative atmosphere within the container.

6 Claims, 7 Drawing Figures

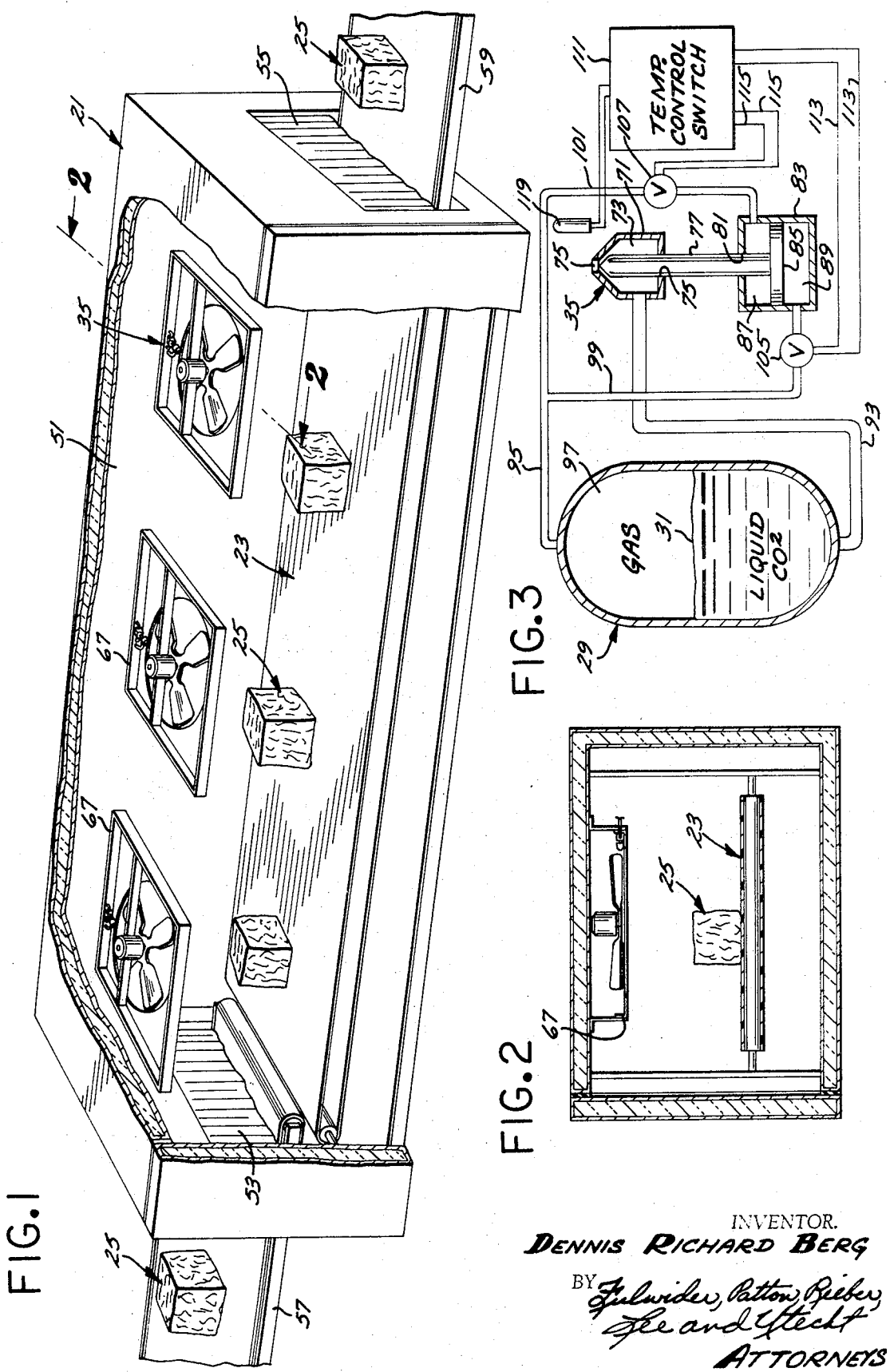

Patented July 18, 1972

INVENTOR.
DENNIS RICHARD BERG

BY Fulwider, Patton, Rieber,
Lee and Utecht
ATTORNEYS

APPARATUS FOR PRESERVATION OF MEAT

BACKGROUND OF THE INVENTION

1. Field of the Invention

The present invention relates to a method and apparatus for packaging meat in an atmosphere of gaseous preservative.

2. Description of the Prior Art

It has been common practice in the storage of fresh meat to place such meat in a container, draw a vacuum thereon, and then flush with a gas preservative and seal the container to maintain a preservative atmosphere therein. U.S. Pat. Nos. 2,838,403; 3,320,075 and 3,387,979 all show different preservative packaging methods and apparatuses for packaging in this manner. These methods and apparatuses all suffer the shortcoming of being relatively slow for production line packaging.

Further, it has been proposed in the food freezing art to freeze vegetables with $CO_2$ and package such vegetables with a crust of $CO_2$ thereon. However, there are no methods or devices known to applicant wherein meat is frozen to form a crust thereon for holding a preservative gas therein while the meat is packaged.

SUMMARY OF THE INVENTION

The preservation method of present invention is characterized by the steps of disposing meat in a cold atmosphere of preservative gas to freeze a crust thereon to trap preservative gas therein and then placing the meat in a container and sealing the container whereby the preservative gas will be released when the meat is thawed to thereby produce a preservative atmosphere within the container.

An apparatus for accomplishing the above-described method includes a freezing tunnel having preservative gas sprayed thereinto and refrigerated to a sufficiently low temperature to cause a crust to be formed on the meat. Some of the preservative gas is trapped in the crust and the meat packaged while the crust remains frozen. When the crust thaws, the preservative gas will be released in the container to provide a preservative atmosphere.

An object of the present invention is to provide a method and apparatus for rapidly packaging individual blocks or cases of meat in a preservative atmosphere.

Another object of the present invention is to provide an apparatus for use in packaging meat in a preservative atmosphere which is economical to build and convenient to operate.

These and other objects and the advantages of the present invention will become apparent from a consideration of the following detailed description when taken in conjunction with the accompanying drawings.

DESCRIPTION OF THE DRAWINGS

FIG. 1 is a perspective view, partially broken away, of a meat preservative apparatus embodying the present invention;

FIG. 2 is a vertical sectional view taken along the line 2—2 of FIG. 1;

FIG. 3 is a schematic view of a preservative gas and refrigerating system which may be utilized with the apparatus shown in FIG. 1;

DESCRIPTION OF THE PREFERRED EMBODIMENT

Figures 6, 7:
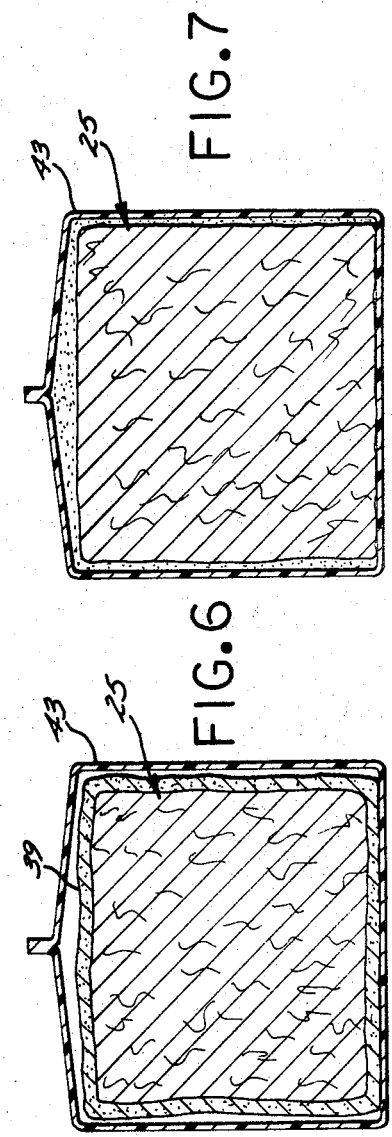
FIGS. 6 and 7 are vertical sectional views, in enlarged scale, taken along the line 6—6 of FIG. 4.

Referring to FIG. 1, the meat preservative apparatus of present invention includes, generally, a freezing tunnel 21 which has a conveyor 23 mounted therein for conveyance of block-ready meat 25 therethrough. Referring to FIG. 3, a storage container 29 is provided for storing liquid $CO_2$ 31 and such liquid $CO_2$ is delivered to a plurality of nozzles, generally designated 35, mounted in the tunnel 21. Thus, a freezing atmosphere of $CO_2$ is maintained in the tunnel 21 and the meat 25 is conveyed from left to right therethrough by means of the conveyor 23. As the meat passes through such tunnel a crust 39 (FIG. 6) is formed thereon to trap $CO_2$ gas therein and when the meat exits the tunnel it is packaged in a container 43 which is hermetically sealed to maintain the $CO_2$ captive therein after the crust 39 thaws as the meat warms.

The tunnel 21 is formed with a freezing chamber 51 having an inlet 53 and an outlet 55. The conveyor 23 leads from such inlet 53 to the outlet 55. A feed conveyor 57 feeds the meat 25 onto the left end of the conveyor 23 and the frozen meat is delivered to a conveyor 59 leading to a sealing apparatus, generally designated 61, (FIG. 4) and then to a storage area 63.

Referring to FIGS. 1 and 2, mounted within the freezing chamber 51 are a plurality of blowers 67 which serve to maintain the cold $CO_2$ gas in circulation to effect rapid freezing of the meat and avoid precipitation and formation of dry ice within the tunnel.

The nozzles 35 are supported from the frames of the blowers 67 and are disposed to spray the cold $CO_2$ in the flow stream through such blowers. Referring to FIG. 3, the nozzles 35 each include an orifice housing 71 formed with a liquid chamber 73 and a spray orifice 75. The rear wall of the housings 71 are formed with bores 76 which receive the front extremity of axially slidable valve stems 77. The rear extremities of the valve stems 77 project through bores 81 in the front wall of cylinder housings 83 and the rear ends of such stems are carried by respective pistons 85 which divide the respective cylinder housings 83 into respective cooling control chambers 87 and warming control chambers 89.

A liquid line 93 leads from the lower portion of the storage container 29 to the liquid orifice chamber 73. A gas line 95 leads from the ullage space 97 of the storage container 29 and branches into a line 99 leading to the warming control chamber 89 and a line 101 leading to the cooling control chamber 87. An electric warming control valve 105 is included in the line 99 and an electric cooling control valve 107 is included in the line 101. A temperature control switch 111 is connected with the respective valves 105 and 107 by means of respective leads 113 and 115 and is responsive to the temperature sensed by a temperature sensing probe 119 disposed in the freezing tunnel to maintain a selected temperature in such tunnel.

Figure 4:
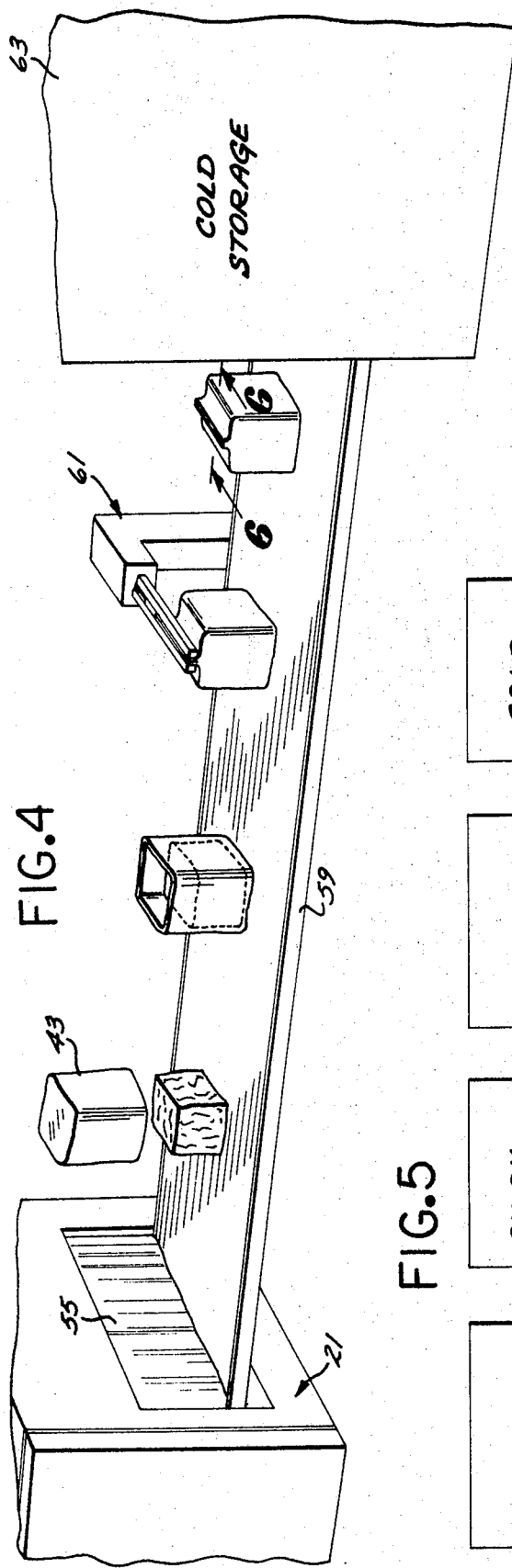
FIG. 4 is a perspective view of meat being packaged for storage after it has left the preservative apparatus shown in FIG. 1.
Figure 5:
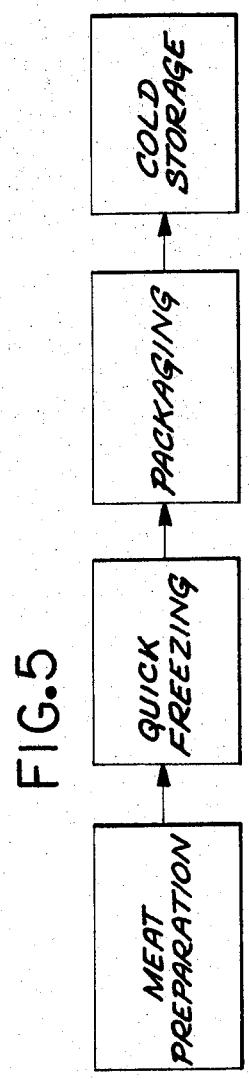
FIG. 5 is a flow diagram of the method of present invention.

Referring to FIG. 4, the sealing apparatus 61 is disposed adjacent the storage conveyor 59 to heat seal the containers 43. Obviously, this sealing apparatus may be of any conventional construction and may, for example, heat seal the containers or press a metal clamp thereon.

In operation the blowers 67 are turned on and the temperature control switch energized to commence cooling of the tunnel 21. The temperature control switch should be set for a relatively cold temperature to effect relatively rapid freezing of the crust 39 on the meat 25 to enable such meat to be wrapped and stored at a relatively rapid rate. For liquid $CO_2$, the temperature in the freezing chamber 51 should be maintained slightly above the boiling point thereof to prevent formation of dry ice within the tunnel and to make full use of the total energy absorption capability of the liquid $CO_2$. In any event, the temperature should be held below −80° F. and above the boiling point of liquid $CO_2$.

As long as the temperature switch 111 calls for cooling, the cooling control valve 107 will remain open to maintain the valve stem 77 retracted from the orifice 75 to enable liquid $CO_2$ to flow through the liquid line 93, into the liquid chamber 73 and out the orifice 75. In this regard, it is important that the pressure drop resulting from control of the liquid $CO_2$ is created at the orifice 75 rather than upstream to thereby avoid creation of a pressure drop in the liquid line which may cause unwanted vapor flashing within the line and disrupt flow therein.

When the target temperature is reached, the cooling valve 107 will close and the warming valve 105 will open to engage the valve stem 77 with the orifice 75 to discontinue spraying into the freezing chamber 51.

The conveyors 57, 23 and 59 will then be started and the meat blocks 25 will be fed through the freezing tunnel 51. The blocks 25 within the tunnel 51 will be exposed to an atmosphere of gaseous $CO_2$ at approximately $-100°$ F. thereby causing a crust 39 to form on the surface of the meat. $CO_2$ will be trapped within the crust 39 and when the blocks of meat 25 leave the exit 55 the crust 39 will have a desired amount of $CO_2$ trapped therein.

An open top film bag 43 may then be placed over the block of meat 25 and the top thereof closed and a seal applied by means of the sealing apparatus 61. It is noted that the bag 43 may closely fit the block of meat 25 and such bag may even be pressed therearound to expel substantially all the oxygen therefrom.

The contained blocks of meat 25 are then delivered to the storage area 63 where the crust 39 will thaw thereby freeing the gaseous $CO_2$ to form an atmosphere within the bag 43 which is high percentage $CO_2$ to act as preservative and maintain the meat in a fresh and desirable state.

A selected amount of oxygen may be trapped in the bag 43 to continue the enzymatic action on the meat 25 to facilitate tenderization. Also, if desired, a film may be utilized for the bag 43 which allows the escape of oxygen therethrough while blocking egress of $CO_2$ thereby creating an atmosphere of an even higher concentration of $CO_2$.

Various modifications and changes may be made with regard to the foregoing detailed description without departing from the spirit of the invention.

I claim:

1. Preservative apparatus for use in packing blocks of meat in an atmosphere of preservative gas, said apparatus comprising:
   a freezing tunnel formed with a freezing chamber having an inlet and an outlet;
   conveyor means in said container for conveying said meat from said inlet to said outlet;
   a storage container for storing a cold liquified gas preservative;
   elongated conduit means leading from said container to said freezing chamber and forming a substantially unrestricted flow path;
   nozzle means connected with said conduit means for discharging said preservative gas into said tunnel, said nozzle means forming a restriction for creating a pressure drop at said nozzle means and for maintaining said conduit means pressurized substantially constant throughout said flow path to prevent any substantial pressure drops therein; and
   temperature control means for controlling said flow control means to maintain the temperature in said tunnel sufficiently low to cause a crust of said gas to be frozen on said meat as it passes therethrough whereby said blocks of meat may be passed through said container and packaged individually in sealed containers to thereby maintain said meat in an atmosphere of said preservative gas when said crust thaws.

2. Preservative apparatus as set forth in claim 1 that includes:
   sealing means for hermetically sealing said container with said block-ready meat contained therein.

3. Preservative apparatus as set forth in claim 1 wherein:
   said container is adapted to store liquid $CO_2$; and
   said temperature control means maintains the temperature in said tunnel in a range slightly above the boiling point of $CO_2$ to thereby make efficient use of the heat absorption capacity of said $CO_2$ and prevent the formation of dry ice in said tunnel.

4. Preservative apparatus as set forth in claim 1 wherein:
   said container is adapted to receive liquid $CO_2$;
   said nozzle means includes an orifice housing formed with an orifice and a control element at said orifice for controlling the rate of discharge therethrough whereby the resultant pressure drop will be at said orifice.

5. Preservative apparatus as set forth in claim 4 wherein:
   said temperature control means includes a housing formed with a pressure chamber, a pressure responsive member disposed in said pressure chamber and coupled with said control element, a conduit leading from said storage container to said housing, valve means in said conduit and responsive to the temperature in said tunnel to control communication through said conduit to control the pressure on said pressure responsive member to control positioning of said control element.

6. Preservative apparatus as set forth in claim 1 wherein:
   said storage container is adapted for receiving a cryogenic fluid; and
   said temperature control means is adapted to maintain the temperature in said tunnel in a range slightly above the boiling temperature of said cryogenic fluid.

* * * * *